(12) United States Patent
Yamamoto et al.

(10) Patent No.: US 9,195,474 B2
(45) Date of Patent: Nov. 24, 2015

(54) SYSTEM AND METHOD PRINT CONTROL DEVICE CONFIGURED TO CONTROL SCREEN DISPLAY UNIT OF RECEIPT PRINTER

(71) Applicant: Seiko Epson Corporation, Tokyo (JP)

(72) Inventors: Takayuki Yamamoto, Matsumoto (JP); Daisuke Kobayashi, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 73 days.

(21) Appl. No.: 14/163,294

(22) Filed: Jan. 24, 2014

(65) Prior Publication Data

US 2014/0215097 A1 Jul. 31, 2014

(30) Foreign Application Priority Data

Jan. 30, 2013 (JP) ................................. 2013-015327

(51) Int. Cl.
*G06F 3/00* (2006.01)
*G06F 13/00* (2006.01)
*G06F 9/44* (2006.01)
*G06F 3/12* (2006.01)

(52) U.S. Cl.
CPC ............ *G06F 9/4411* (2013.01); *G06F 3/1205* (2013.01); *G06F 3/1253* (2013.01); *G06F 3/1284* (2013.01)

(58) Field of Classification Search
CPC .............................. G06F 3/1052; G06F 3/1253
USPC ................................. 710/62–64; 713/1, 2, 100
See application file for complete search history.

(56) References Cited

U.S. PATENT DOCUMENTS

| 7,353,373 B2 * | 4/2008 | Olbricht ............................ 713/1 |
| 9,025,193 B2 * | 5/2015 | Asano ........................... 358/1.16 |
| 2010/0171627 A1 | 7/2010 | Takizawa |

FOREIGN PATENT DOCUMENTS

| JP | 2002-099968 A | 4/2002 |
| JP | 2010-176655 A | 8/2010 |
| JP | 2011-008318 A | 1/2011 |
| JP | 2012-084046 A | 4/2012 |

* cited by examiner

*Primary Examiner* — Tammara Peyton
(74) *Attorney, Agent, or Firm* — Nutter McClennen & Fish LLP (57) ABSTRACT

A print control device, a control method of a print control device, and a recording medium storing a program enable easily configuring a peripheral device connected to a printer. A POS terminal that configures peripheral devices connected to a receipt printer has a device configuration selection unit for selecting a configuration of peripheral devices; and a device configuration screen display unit that displays a configuration screen for the peripheral devices based on the selected device configuration. Because a configuration screen for a peripheral device that is not connected to the receipt printer (a configuration screen that is not needed) is not displayed, the risk of creating confusion regarding the configuration of a peripheral device for the user can be reduced.

17 Claims, 12 Drawing Sheets

SYSTEM AND METHOD PRINT CONTROL DEVICE CONFIGURED TO CONTROL SCREEN DISPLAY UNIT OF RECEIPT PRINTER

This application claims priority under 35 U.S.C. §119 to Japanese Patent Application No. 2013-015327 filed on Jan. 30, 2013, the entire disclosure of which is expressly incorporated by reference herein.

BACKGROUND

1. Technical Field

The present invention relates to a print control device that controls a printing device, a control method of the print control device, and a recording medium storing a program.

2. Related Art

Printing data created on a personal computer (PC), for example, with a printing device (printer) generally requires installing a printer driver (device driver) written for a particular printer model on the PC. The printer driver presents a configuration screen (user interface) containing multiple parameter settings for configuring the printing process, and the user can desirably set the printing conditions on this setup screen. See, for example, JP-A-2012-84046. JP-A-2010-176655 further teaches a printing device that can connect to a peripheral device such as a cash drawer.

When another peripheral device can be connected to the printer for use as described in JP-A-2010-176655, settings for the peripheral device can preferably also be controlled from the setup screen (user interface) presented by the printer driver installed on the PC. However, when plural peripherals can be connected to the printer, and when the configuration (combination) of connected peripherals differs according to the user's application, configuring settings in the setup screen can be confusing for the user.

SUMMARY

A print control device, a control method of a print control device, and a program according to at least one embodiment of the present invention enable easily configuring peripheral devices connected to a printing device.

A print control device according to at least one embodiment of the present invention enables configuring peripheral devices connected to a printer, and has a device configuration selection unit for selecting the configuration of peripheral devices; and a device configuration screen display unit that displays a configuration screen of peripheral device based on the selected device configuration.

A control method of a print control device that configures a peripheral device connected to a printing device, including: a device configuration selection step that receives a selection of a peripheral device configuration; and a peripheral device configuration screen display step that displays a configuration screen of peripheral device based on the selected device configuration.

A print control device according to another aspect of at least one embodiment of the present invention preferably also has a device configuration information acquisition unit that acquires device configuration information from the printing device for peripheral devices connected to the printing device; and the device configuration selection unit selects the configuration of peripheral devices based on the device configuration information acquired by the device configuration information acquisition unit.

In a print control device according to another aspect of at least one embodiment of the present invention, the device configuration screen display unit preferably displays a setup screen for the peripheral devices based on the device configuration as a single configuration screen.

Another aspect of at least one embodiment of the present invention is a computer-readable recording medium storing a program executed by a control unit of a print control device that configures a peripheral device connected to a printing device, including as steps executed by the control unit: a device configuration selection step that receives a selection of a peripheral device configuration; and a device configuration screen display step that displays a configuration screen of the peripheral device based on the selected device configuration.

DESCRIPTION OF EMBODIMENTS

Some embodiments of a print control device, a control method of a print control device, and a program according to the present invention are described below with reference to the accompanying figures. This embodiment describes an example in which the print control device is a POS terminal (host device) used in a POS system, and the printing device is a receipt printer.

Figure 1:
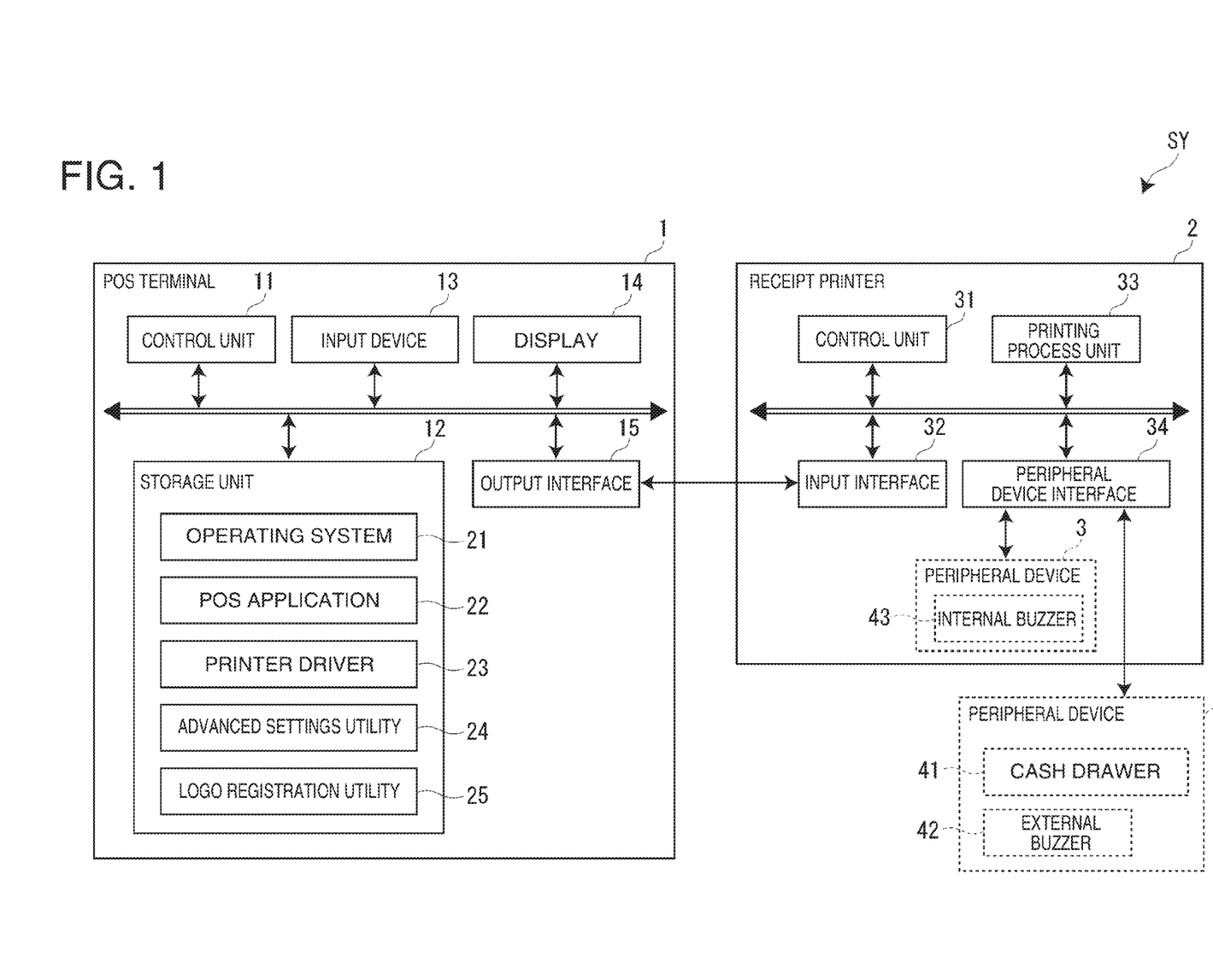
FIG. 1 is a control block diagram of a POS system according to some embodiments.

FIG. 1 describes the control configuration of a POS system SY according to this embodiment of the invention. As shown in the figure, the POS system SY includes a POS terminal 1 (print control device) that runs a transaction process, for example, and a receipt printer 2 (printing device) that produces receipts. The POS terminal 1 and receipt printer 2 are connected through a serial interface (such as a USB (Universal Serial Bus) interface). The receipt printer 2 produces a receipt by printing on roll paper, which is a continuous web of paper wound into a roll, and then cutting the paper to a specific length by means of a paper feed mechanism and cutting mechanism (automatic cutter) not shown. The roll paper is normally paper of a standard width such as 80 mm or 58 mm, but paper of a user-selected custom width can also be used. As may be needed (according to the user's application), a peripheral device 3 (this embodiment describes a cash drawer 41, external buzzer 42 (optional buzzer), and internal buzzer 43 as examples) can also be connected to the receipt printer 2.

The POS terminal 1 runs a transaction process based on product information that is input, and configures the receipt printer 2 and peripheral devices 3. The POS terminal 1 includes a control unit 11, storage unit 12, input device 13, display 14, and output interface 15.

The control unit 11 includes a CPU (central processing unit), ROM (read-only memory) that stores control data and control programs for the CPU to execute processes, RAM (random access memory) that is used as working memory when the CPU executes a process, and centrally controls the POS terminal 1.

The input device 13 is a keyboard or barcode reader, for example, and is used to input product information and settings for the POS terminal 1, receipt printer 2, and peripheral device 3. The display 14 functions as a display means for displaying information to the user. More particularly, in this embodiment the display 14 is used to display a user interface provided by a printer driver 23 as described below. The output interface 15 is an interface for connecting a receipt printer 2, and outputs data (such as print data and peripheral device control commands) to the receipt printer 2.

The storage unit 12 stores an operating system 21 (OS), a POS application 22, a printer driver 23 (device driver), an advanced settings utility 24, and a logo registration utility 25. The POS application 22 is an application program for running the transaction process.

The printer driver 23 together with the advanced settings utility 24 and logo registration utility 25 described below is an essential element of the invention, and includes a function for generating print data corresponding to the function of the receipt printer 2 based on output data from the POS application 22, and a function for providing a user interface for the user to control the print settings of the receipt printer 2 and the setup of peripheral devices 3 connected to the receipt printer 2.

The advanced settings utility 24 is a utility program called from the printer driver 23. The logo registration utility 25 is a utility program called from the advanced settings utility 24. Both utilities provide a user interface for configuring the print settings of the receipt printer 2 and the peripheral devices 3 similarly to the printer driver 23. The user configures the receipt printer 2 and peripheral device 3 settings through the user interfaces provided by the printer driver 23, advanced settings utility 24, and logo registration utility 25 (as described in detail below).

The receipt printer 2 is a printer that has device fonts installed (printer fonts, not shown in the figures), and includes an input interface 32, a printing process unit 33, a peripheral device interface 34, and a control unit 31 that controls these other parts. The receipt printer 2 also has a storage unit not shown that stores the settings, device font, and logo image.

The input interface 32 is an interface for connecting to the POS terminal 1, and receives data (including print data and peripheral device control commands) output from the POS terminal 1. The printing process unit 33 prints on receipt paper based on print data output from the POS terminal 1, and produces a receipt. The peripheral device interface 34 is an interface for connecting peripheral devices 3 such as a cash drawer 41, external buzzer 42, and internal buzzer 43.

The control unit 31 includes a CPU (central processing unit), ROM that stores control data and control programs for the CPU to execute processes, RAM (random access memory) that is used as working memory when the CPU executes a process, and centrally controls the receipt printer 2. When the data acquired from the POS terminal 1 through the input interface 32 is print data, the control unit 31 controls the printing process unit 33 to print a receipt. When the data acquired from the POS terminal 1 is a peripheral device control command, the control unit 31 outputs the command through the peripheral device interface 34 to the peripheral device 3.

A user interface for configuring the receipt printer 2 and peripheral devices 3 is described next with reference to FIG. 2 to FIG. 12. As described above, the user interface is provided by the printer driver 23, advanced settings utility 24, and logo registration utility 25 that operate as controlled by the control unit 11. FIG. 2 to FIG. 5 describe a user interface provided by the printer driver 23. FIG. 6 to FIG. 11 describe a user interface provided by the advanced settings utility 24 and logo registration utility 25. FIG. 12 is a flow chart describing the control process of the advanced settings utility 24 when running the logo registration utility 25.

The user interface provided by the printer driver 23 is described first with reference to FIG. 2 to FIG. 5. As shown in the figures, the printer driver 23 provides a printer settings interface 51 with seven tabs, labelled layout, paper/print quality, paper feed and cutting, peripheral devices, advanced settings, about, and language, as the user interface for printer settings. The printer settings interface 51 primarily enables the user to control basic settings for the receipt printer 2 and peripheral devices 3.

Figure 2A:
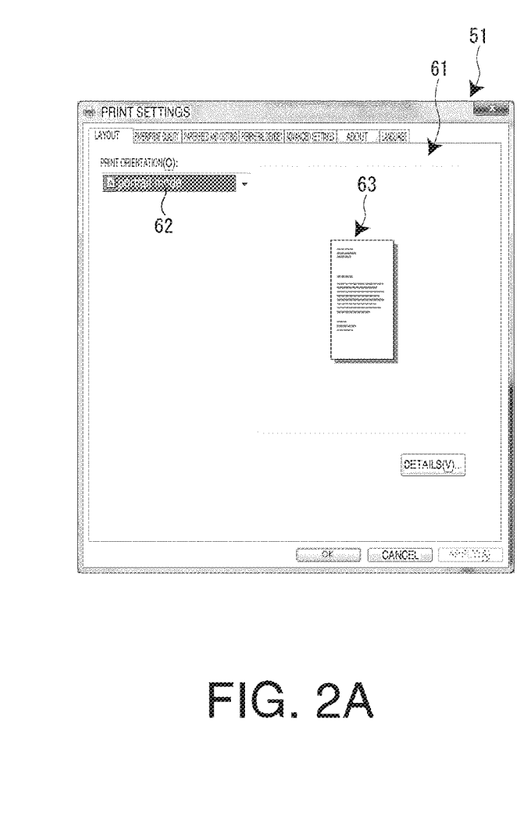
FIG. 2A describes the layout (print orientation) selection screen.
Figure 2B:
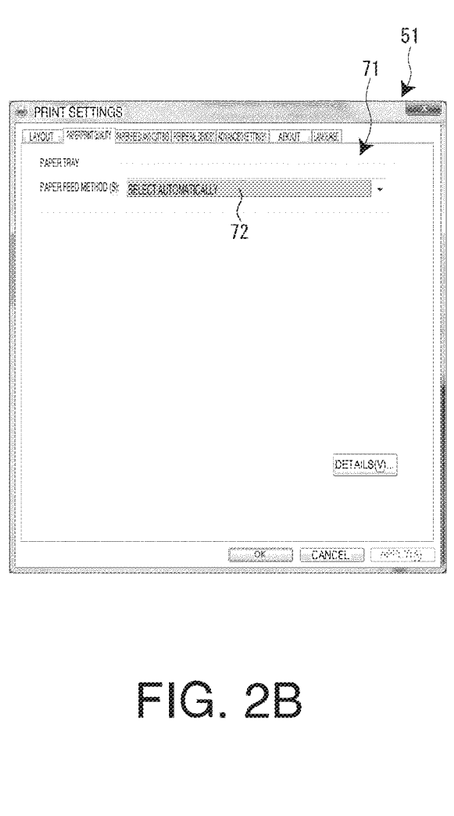
FIG. 2B describes the paper selection and print quality selection screen.
Figure 2C:
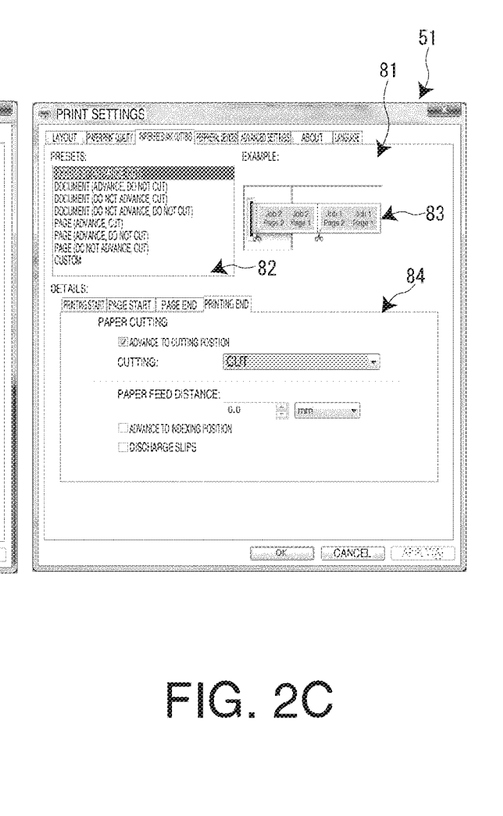
FIG. 2C describes the paper feed and cutting selection screen.

The print orientation screen 61 (layout tab) is a screen for setting the print orientation (such as portrait mode, rotate 90 degrees, rotate 180 degrees, rotate 270 degrees) from a pull-down menu 62. A preview 63 corresponding to the selected print orientation is also displayed (FIG. 2A). The paper/print quality screen 71 (paper/print quality tab) is used to set the paper feed method of the print medium (select the supply tray) from a pulldown menu 72 (FIG. 2B).

The paper feed/cutting screen 81 (paper feed and cutting tab) is for setting the paper feed method of the receipt paper (print medium) and the timing for cutting the paper. Whether to advance the paper (feed/no feed) and whether or not to cut the paper with the automatic cutter (cut/no cut) after every printed document or every page can be selected from a list box 82 in the paper feed/cutting screen 81. The paper feed/cutting screen 81 also displays a preview 83 reflecting the setting. Based on the selection made in the list box 82, the timing for cutting the paper can be set to the start of printing, the page start, the page end, or the end of printing, and the paper feed distance, can be set in the detailed settings area 84. See FIG. 2C.

Figure 3A:
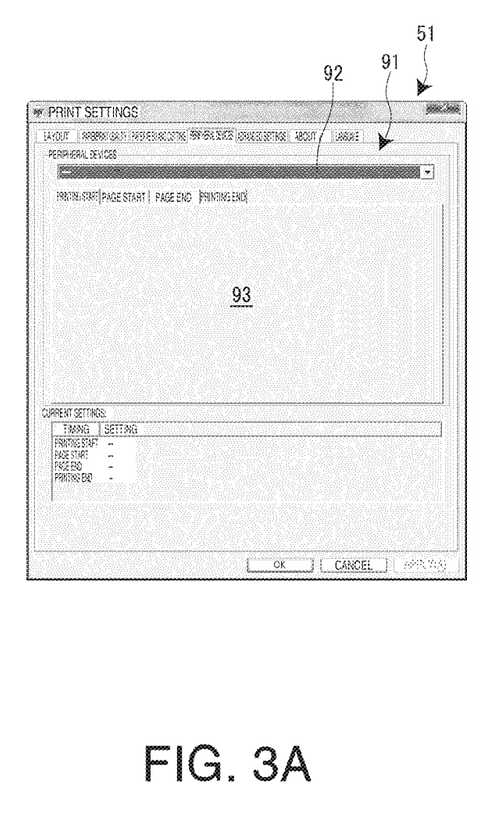
FIG. 3A describes the configuration screen of the peripheral device when a peripheral device is not connected.
Figure 3B:
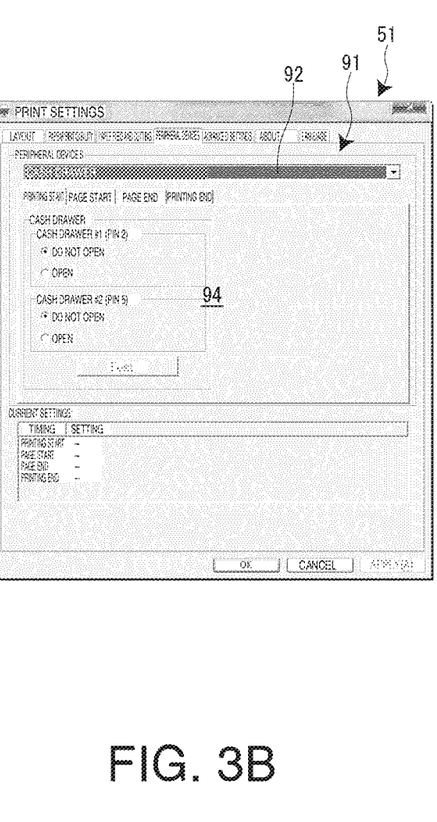
FIG. 3B describes the configuration screen of the peripheral device when a cash drawer is connected.
Figure 3C:
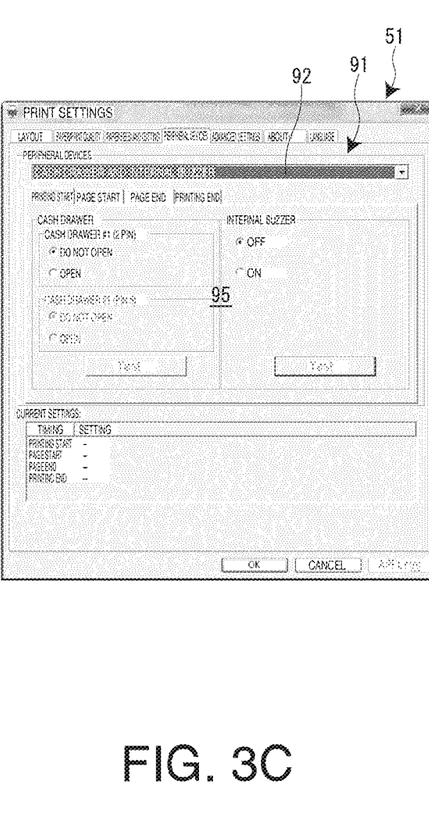
FIG. 3C describes the configuration screen of the peripheral device when a cash drawer and internal buzzer are connected.
Figure 4A:
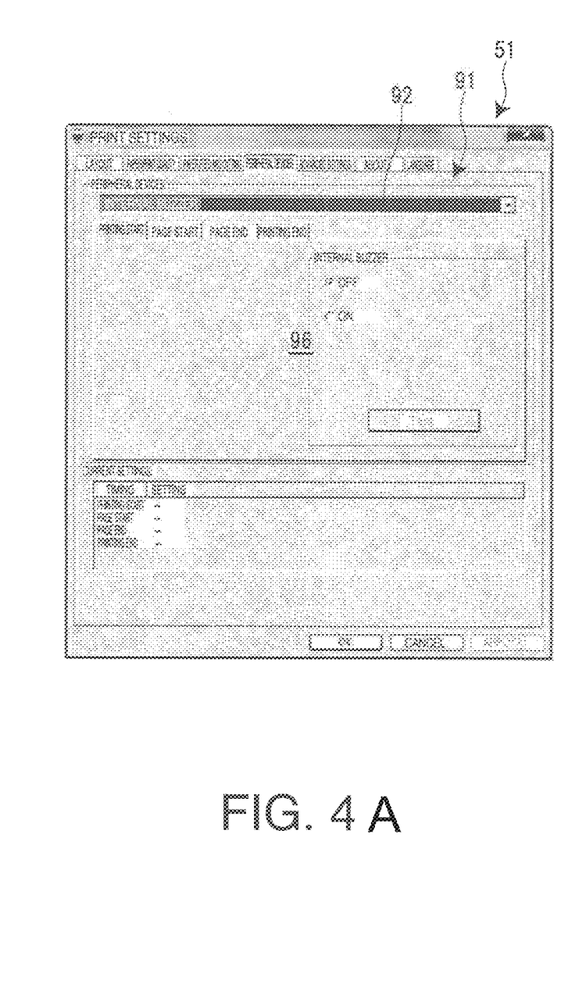
FIG. 4A describes the configuration screen of the peripheral device when an internal buzzer is connected.
Figure 4B:
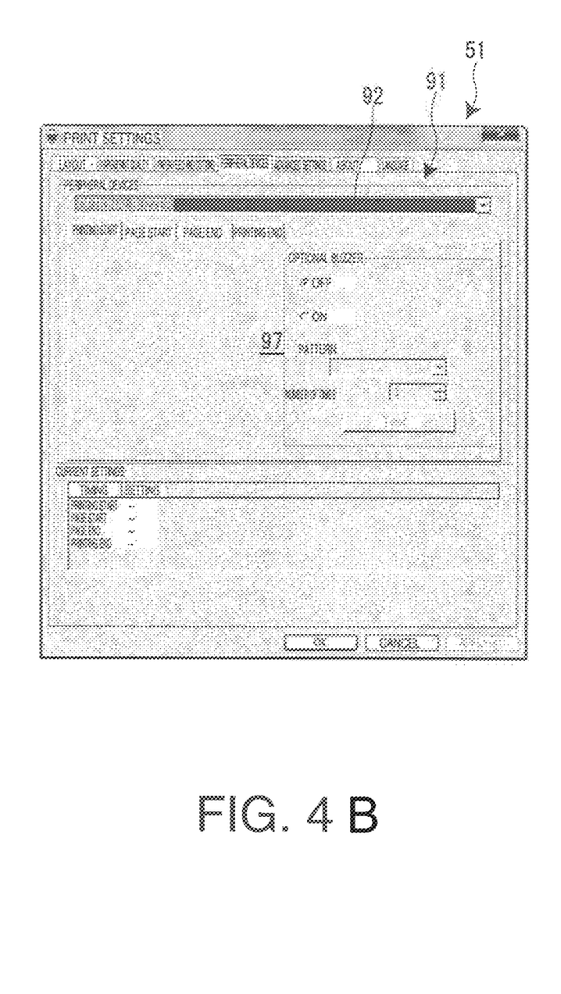
FIG. 4B describes the configuration screen of the peripheral device when an external buzzer is connected.

The configuration screen 91 (peripheral device tab) of the peripheral device shown in FIG. 3 and FIG. 4 corresponds to the functional configuration of the peripheral device 3 connected to the receipt printer 2. By selecting the item corresponding to the functional configuration of the peripheral device 3 connected to the receipt printer 2 from the pulldown menu 92 (device configuration selection unit) at the top of the screen, a configuration screen specific to the peripheral device 3 matching the selected configuration is displayed.

For example, when a peripheral device 3 is not connected to the receipt printer 2, the user selects the null (-) option meaning a peripheral device 3 is not present from the pulldown menu 92 as shown in FIG. 3A. In this event, the device configuration screen display unit displays a configuration area 93 with no settings related to a peripheral device 3. More specifically, because user configuration of the peripheral device 3 is unnecessary, a blank window where nothing can be configured is displayed. By selecting an appropriate tab, how to control the peripheral device 3 when printing starts, at the page start, the page end, and when printing ends, can be set in the configuration area 93 (here and below). When the null (-) item is selected from the pulldown menu 92, no settings are displayed in the configuration area 93 whether the printing start, page start, page end, or printing end tab is selected as described above.

When a cash drawer 41 (a maximum of two cash drawers 41 can be connected in this embodiment) is connected to the receipt printer 2 as the peripheral device 3, the user selects cash drawer from the pulldown menu 92 as shown in FIG. 3B. In this event, a configuration window 94 for setting whether or not to open (open/do not open) the cash drawer 41 at each of the printing start, page start, page end, and printing end times is displayed (device configuration screen display unit).

When a cash drawer 41 and internal buzzer 43 are connected to the receipt printer 2 as peripheral devices 3, the user selects cash drawer and internal buzzer from the pulldown menu 92 as shown in FIG. 3C. In this event, a configuration window 95 for setting whether or not to open (open/do not open) the cash drawer 41, and whether or not to sound the internal buzzer 43 (sound/do not sound) at each of the printing start, page start, page end, and printing end times is displayed (device configuration screen display unit).

When only an internal buzzer 43 is connected to the receipt printer 2 as a peripheral device 3, the user selects internal buzzer from the pulldown menu 92 as shown in FIG. 4A. In this event, a configuration window 96 for setting whether or not to sound the internal buzzer 43 (sound/do not sound) at each of the printing start, page start, page end, and printing end times is displayed (device configuration screen display unit).

When only an external buzzer 42 (optional buzzer) is connected to the receipt printer 2 as a peripheral device 3, the user selects optional buzzer from the pulldown menu 92 as shown in FIG. 4B. In this event, a configuration window 97 for setting whether or not to sound the external buzzer 42 (sound/do not sound) at each of the printing start, page start, page end, and printing end times is displayed, and when the external buzzer 42 is set to sound, areas for selecting the sound pattern of the buzzer and the number of times the buzzer sounds are enabled (device configuration screen display unit).

More specifically, when the user selects the item corresponding to the device configuration of the peripheral device 3 connected to the receipt printer 2 from the pulldown menu 92, the configuration screen 91 of the peripheral device pre-sents only those items related to the peripheral device 3 actually connected to the receipt printer 2 in a single configuration screen.

Figure 5A:
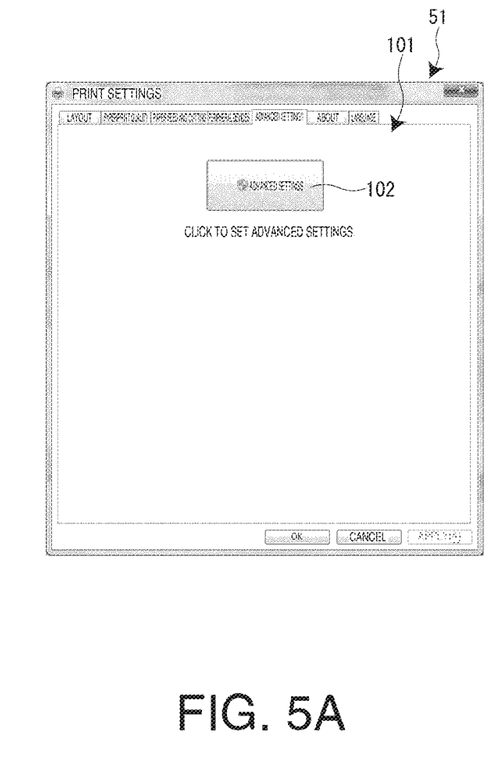
FIG. 5A describes an advanced settings screen.
Figure 6A:
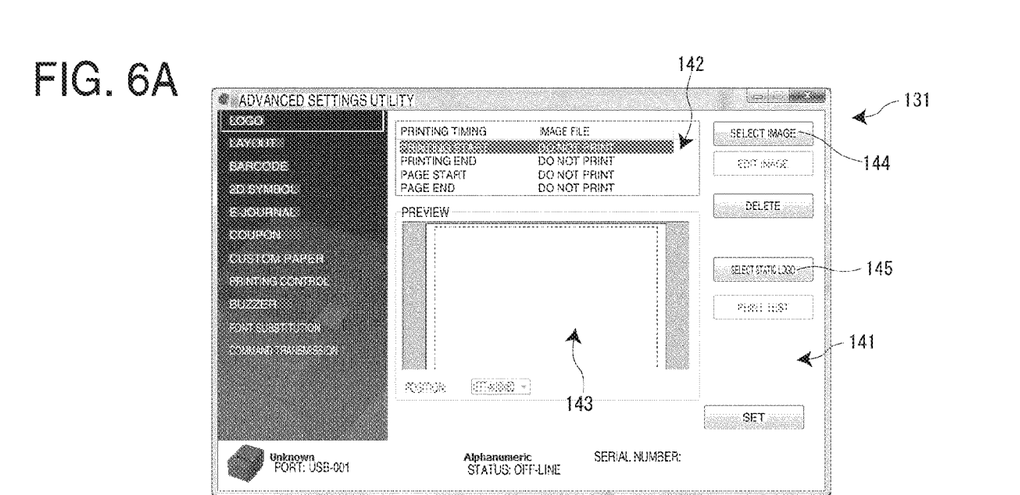
FIG. 6A describes a logo configuration screen.

The advanced settings screen 101 (advanced settings tab) shown in FIG. 5A is a screen for configuring the print settings in greater detail. When the user presses on the advanced settings button 102 in this screen, the printer driver 23 starts the advanced settings utility 24. As a result, the advanced settings utility 24 then displays a new user interface in a separate window (the advanced settings interface screen 131 as shown in FIG. 6), and various settings can be made in this window (as described in detail below).

Figure 5B:
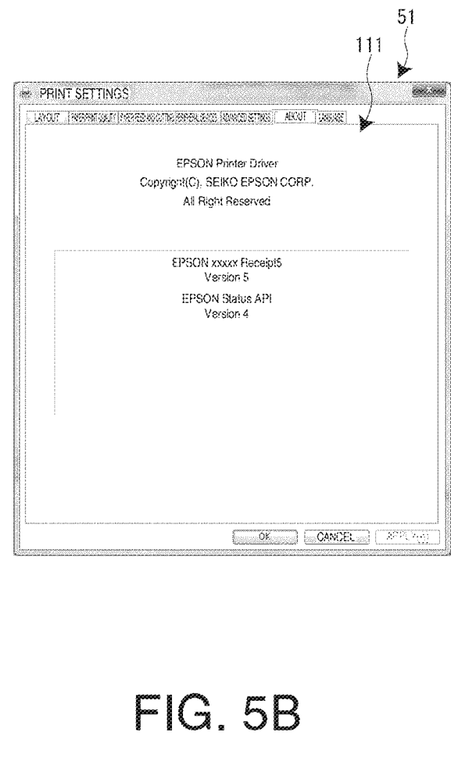
FIG. 5B describes an about screen showing the printer driver version.
Figure 5C:
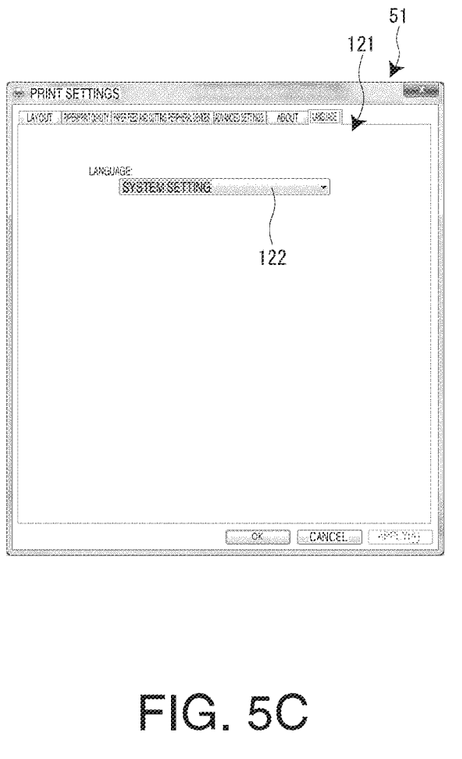
FIG. 5C describes a language selection screen.

The about screen 111 (version tab) is a screen that displays the version number and other information about the printer driver 23 (see FIG. 5B). The language selection screen 121 (language tab) is a screen for selecting the display language in the above windows from a pulldown menu 122 (see FIG. 5C).

The advanced settings interface screen 131 provided by the advanced settings utility 24 is described next with reference to FIG. 6 to FIG. 12. As described above, the advanced settings interface screen 131 is presented when the advanced settings button 102 is pressed in the advanced settings screen 101 of the printer driver 23 (FIG. 5A). The advanced settings utility 24 provides eleven configuration screens as part of the advanced settings interface screen 131, that is, logo, layout, barcode, 2D symbol, e-journal, coupon, custom paper, printing control, buzzer, font substitution, and command transmission.

The logo configuration screen 141 in FIG. 6 is a screen for setting the logo image that is printed on the receipt paper (print medium), and enables configuring the logo that is printed at printing start, page start, page end, and printing end. The available settings are displayed in a list box 142, and when a logo image (image file) is set for the item selected in the list box 142, the logo is displayed in a preview area 143.

In addition to logo images stored on the POS terminal 1, logo images already registered in the receipt printer 2 can also be selected in the logo configuration screen 141 as the logo to be printed at specific times in the printing process. When selecting a logo stored on the POS terminal 1, the desired image file can be selected from a file selection window (not shown in the figure) that is displayed when the image selection button 144 is pressed.

A logo already registered in the receipt printer 2 can be selected by pressing the select NV (non-volatile) logo button 145. When the select NV logo button 145 is pressed, a key code selection window 146 (see FIG. 6B) is displayed as a modal dialog, and a logo image registered (stored) in the receipt printer 2 can be selected by specifying the key code corresponding to the logo image in this dialog.

Figure 6B:
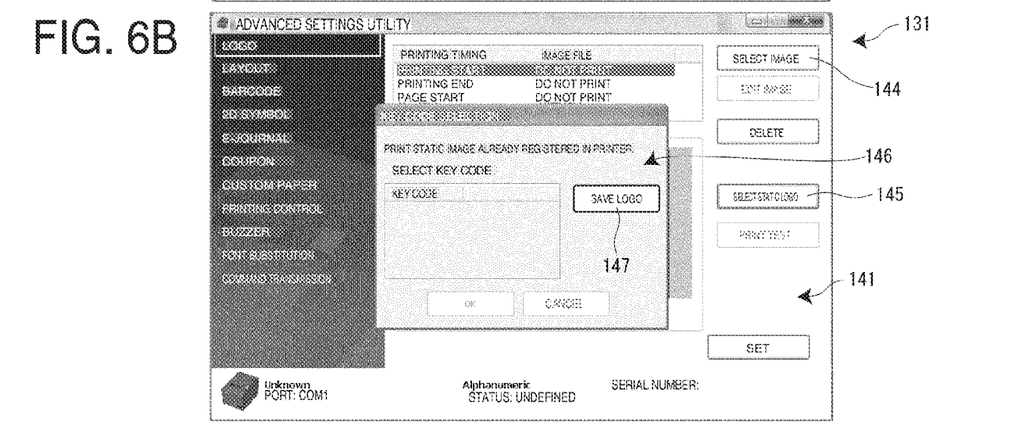
FIG. 6B describes a logo configuration screen.

A new logo image can be registered in the receipt printer 2 using the key code selection window 146. Registering a logo image is done by pressing the register logo button 147. More specifically, when the register logo button 147 is pressed, the advanced settings utility 24 starts the logo registration utility 25. A logo registration screen 148 (FIG. 6C) is then displayed by the logo registration utility 25. A new logo image can be registered in the receipt printer 2 by selecting the image data to register as the logo, and a key code related to the image data, in the logo registration screen 148.

Figure 6C:
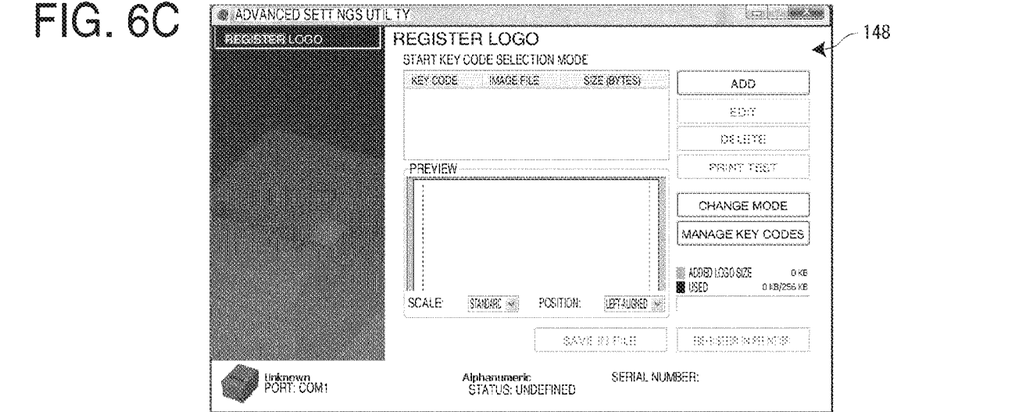
FIG. 6C describes a logo registration screen.

The logo registration utility 25 (logo registration screen 148) starts in a different process as the advanced settings utility 24. More specifically, the logo configuration screen 141 provided by the advanced settings utility 24, and the logo registration screen 148 provided by the logo registration utility 25, are displayed simultaneously on the display 14. Because these are separate processes, both screens can normally be used by simply switching therebetween as desired. However, while the logo registration screen 148 is displayed, operations in the logo configuration screen 141 (including the key code selection window 146) are not accepted. This embodiment of the invention also reflects content set in the logo registration screen 148 in the logo configuration screen 141 without interprocess communication. More specifically, the advanced settings utility 24 controls the logo registration utility 25 started in a separate process as a modal dialog of the advanced settings utility 24 process. This control process is further described below with reference to FIG. 12.

FIG. 12 is a flow chart of the advanced settings utility 24 control process when running the logo registration utility 25. Note that execution of the advanced settings utility 24 and logo registration utility 25 is controlled by the control unit 11 of the POS terminal 1.

When the register logo button 147 is pressed in the key code selection window 146 (FIG. 6B), the advanced settings utility 24 instantiates a thread that starts and waits for termination of the logo registration utility 25 (S01), and starts the logo registration utility 25 in a separate process (S02). Next, the advanced settings utility 24 executes a process that controls its own user interface, that is, disables operations on the logo configuration screen 141 and key code selection window 146 (S03). This process that disables interface operation continues until the logo registration utility 25 process ends (S04 returns NO).

Information in the receipt printer 2 (information related to the logo image and key code, referred to below as the key code information) is updated by registering or deleting a logo on the receipt printer 2 using the logo registration utility 25. When the logo registration utility 25 process ends, the advanced settings utility 24 detects termination of this process (S04 returns YES). Triggered by detecting termination of the logo registration utility 25 process, the advanced settings utility 24 then enables using its own user interface (S05), references key code information in the receipt printer 2, and updates the user interface display (key code selection window 146) of the advanced settings utility 24 (S06). The advanced settings utility 24 then discards the thread started in step S01 (S07).

This process enables the advanced settings utility 24 to use the logo registration utility 25 that was started in a separate process as a modal dialog of the advanced settings utility 24 process without using interprocess communication. As a result, operations in the logo configuration screen 141 (including the key code selection window 146) can be disabled while the logo registration utility 25 is running, and the user can be prevented from performing unnecessary operations.

Figure 7A:
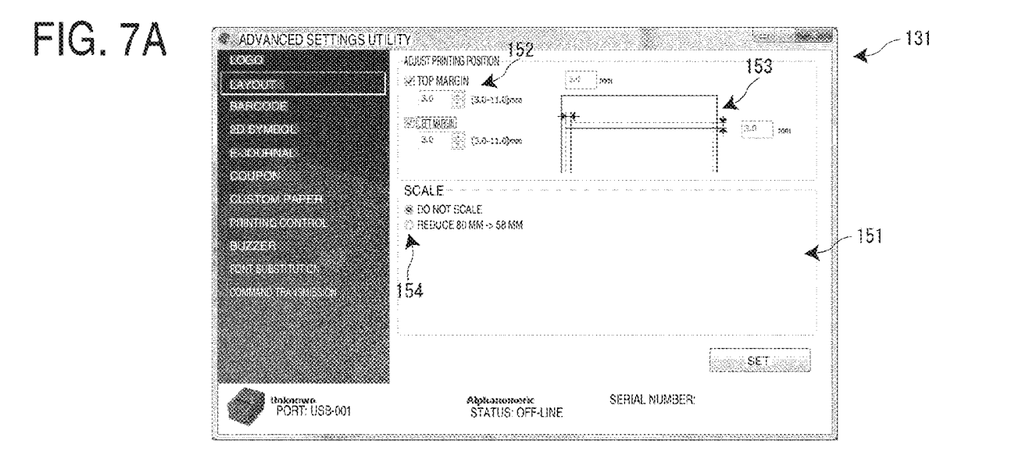
FIG. 7A describes a print layout configuration screen.

Returning to describing the advanced settings interface screen 131, the layout settings screen 151 shown in FIG. 7A is a screen for adjusting the printing position on the receipt paper, and setting whether or not to scale down the printed image. The top margin and left margin used for printing can be adjusted in the printing position adjustment field 152. The layout settings screen 151 also displays a preview of the printout after adjusting the top margin and left margin in the preview area 153. Whether to reduce the printed image can be set using a radio button 154 (no scaling, scale from 80 mm to 58 mm).

Figure 7B:
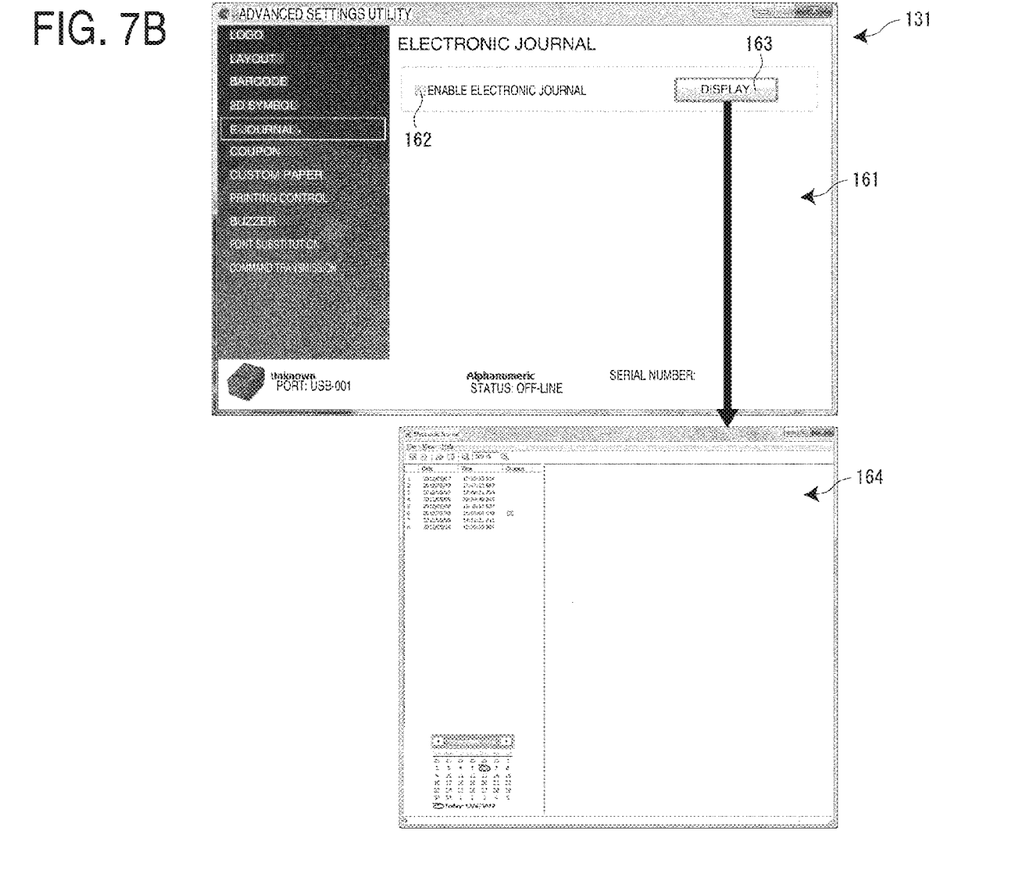
FIG. 7B describes an electronic journal configuration screen.

The electronic journal configuration screen 161 is a screen for setting whether or not save a copy of the printed receipt to an electronic journal file (see FIG. 7B). The information printed on a receipt is saved as a file if the enable electronic journal checkbox 162 is checked. Pressing the display button 163 then displays the electronic journal screen 164, and saved electronic journal files can be referenced, printed, and searched.

Figure 8A:
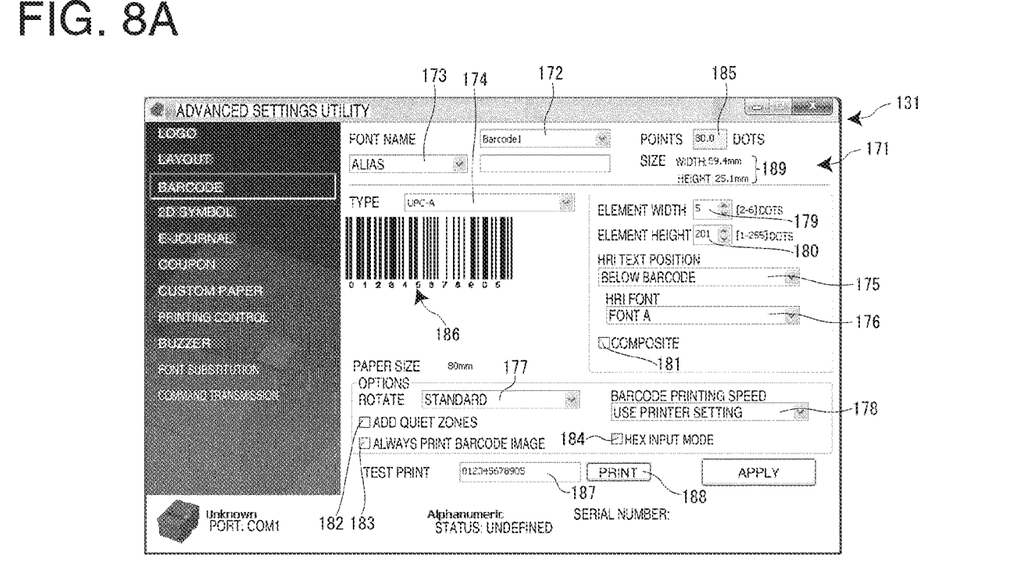
FIG. 8A describes a barcode configuration screen.
Figure 8B:
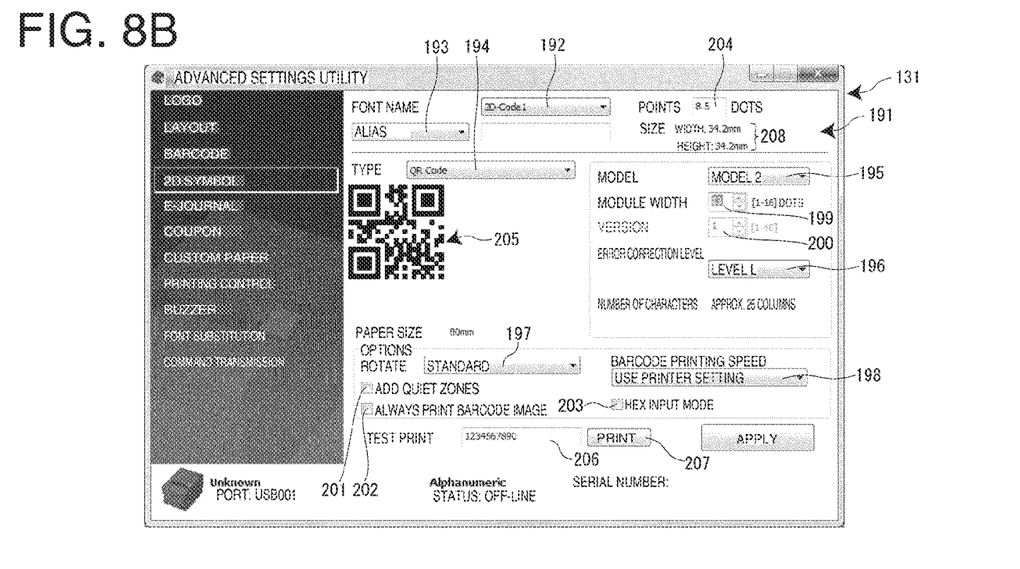
FIG. 8B describes a 2D symbol configuration screen.

The barcode configuration screen 171 and 2D symbol configuration screen 191 are described next with reference to FIG. 8A and FIG. 8B. As shown in FIG. 8A, the barcode configuration screen 171 is a screen for configuring printing a barcode on the receipt paper. The barcode configuration screen 171 includes plural pulldown menus 172 to 178, plural text boxes 179, 180, and plural checkboxes 181 to 184.

Pulldown menu 172 is for selecting the barcode font. The point size (font size) specified when the POS application 22 uses the selected barcode font is shown on the right side (reference numeral 185) of the pulldown menu 172. Pulldown menu 173 sets the alias for the barcode font. Pulldown menu 174 selects the type of barcode, examples of which include UPC-A, UPC-E, JAN13 (EAN), JAN8 (EAN), Code39, and ITF.

The text boxes 179, 180 are for respectively setting the element width and height of the barcode. Pulldown menu 175 is for setting the printing position of the HRI (human readable interpretation) text added to the barcode from among choices including above the barcode, below the barcode, above and below the barcode, and do not print. Pulldown menu 176 is for setting the font used for the HRI text. Checkbox 181 is for setting whether or not to print a composite symbol.

Pulldown menu 177 is for setting the barcode printing orientation. Selections include standard (no rotation), rotate 90 degrees, rotate 180 degrees, and rotate 270 degrees. Pulldown menu 178 is for setting the barcode printing speed. Checkbox 182 is for setting whether or not to add quiet zones (blank space on the left and right sides of the barcode required for reading the barcode). Checkbox 183 is for selecting whether to generate the barcode on the printer driver 23 side or generate the barcode on the receipt printer 2 side. Checkbox 184 is for setting whether or not to input the barcode string in binary code. By desirably setting these items, the user can print barcodes as desired.

The barcode configuration screen 171 also displays a preview of the barcode image 186 when the barcode is printed with the settings (parameters) selected above. When data for test printing is input to the text box 187 and the preview button 188 is pressed, the barcode image 186 is created based on the test print data (numbers) that was input and the content of the above settings. In addition to a preview of the barcode image 186, the size when the barcode is actually printed on receipt paper (barcode size 189) is also displayed in the barcode configuration screen 171. The barcode size 189 is calculated based on the barcode element width and height settings described above, the resolution of the receipt printer 2, and the paper width of the receipt paper that is used, and is displayed at the same time as the preview of the barcode image 186 is displayed.

As described above, displaying a preview of the printed barcode (barcode image 186) and the barcode size 189 when actually printed in the barcode configuration screen 171 is particularly convenient because the user can easily check how the barcode will appear and the size of the barcode when printed without actually printing the barcode to paper. In addition, because the barcode can be confirmed without actually printing to receipt paper, receipt paper can be saved. Furthermore, when a preview of the barcode image 186 is not displayed, the user can easily know the barcode cannot be printed because of a configuration error.

The 2D symbol configuration screen 191 is a screen (see FIG. 8B) for configuring printing a 2D symbol on receipt paper. The 2D symbol configuration screen 191 includes plural pulldown menus 192 to 198, plural text boxes 199, 200, and plural checkboxes 201 to 203.

Pulldown menu 192 is for selecting the font (2D symbol font) for printing the 2D symbol. The point size (font size) specified when the POS application 22 uses the selected 2D symbol font is shown on the right side (reference numeral 204) of the pulldown menu 192. Pulldown menu 193 sets the alias for the 2D symbol font. Pulldown menu 194 selects the type of 2D symbol, examples of which include QR code and PDF417.

Pulldown menu 195 is for setting the model (such as model 1 or model 2) of the 2D symbol type set with the pulldown menu 194. Text box 199 is for setting the size (module width) of the 2D symbol. Text box 200 is for setting the version of the 2D symbol. Pulldown menu 196 is for setting the error correction level of the 2D symbol from among settings such as error correction level L, level M, level Q, and level H.

Pulldown menu 197 sets the print orientation of the 2D symbol. Options include standard (no rotation), rotate 90 degrees, rotate 180 degrees, and rotate 270 degrees. Pulldown menu 198 is for setting the 2D symbol printing speed. Checkbox 201 is for setting whether or not to add quiet zones (blank space that is added on the left and right sides of the 2D symbol and is required to read the 2D symbol). Checkbox 202 is for selecting whether to generate the 2D symbol on the printer driver 23 side or generate the 2D symbol on the receipt printer 2 side. Checkbox 203 is for setting whether or not to input the 2D symbol string in binary code. By desirably setting these items, the user can print 2D symbols as desired.

As with the barcode configuration screen 171, the 2D symbol configuration screen 191 also displays a preview of the 2D symbol image 205 when the barcode is printed with the settings (parameters) selected above, and displays the size when the 2D symbol is actually printed on receipt paper (2D symbol size 208). When data for test printing is input to the text box 206 and the preview button 207 is pressed, the 2D symbol image 205 is created based on the test print data (numbers) that was input and the content of the above settings. The 2D symbol size 208 is calculated based on the module width of the 2D symbol set above, the resolution of the receipt printer 2, and the paper width of the receipt paper that is used, and is displayed at the same time as the preview of the 2D symbol image 205 is displayed. Displaying the 2D symbol image 205 and 2D symbol size 208 has the same effect as with the barcode described above.

Figure 9A:
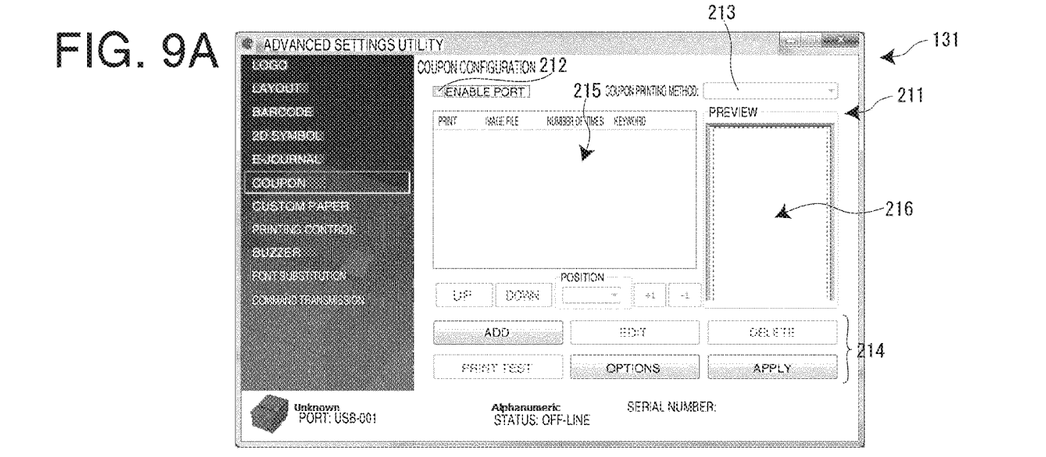
FIG. 9A describes a coupon configuration screen.

The coupon configuration screen 211 shown in FIG. 9A is a screen for setting up a coupon for printing. Check box 212 is checked to print a coupon. When check box 212 is checked, the printing method used to print the coupon can be selected from pulldown menu 213. Whether to add, edit, delete, or test print the coupon to be produced can be selected from the group of buttons 214. Added coupon information is displayed in list box 215, and an image of the coupon selected in the list box 215 is displayed in a preview area 216.

Figure 9B:
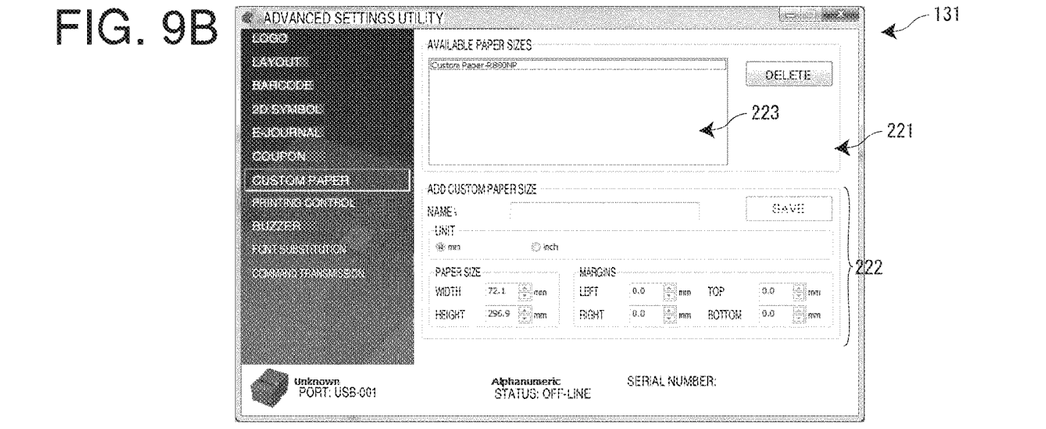
FIG. 9B describes a user-defined customer paper size configuration screen.
Figure 9C:
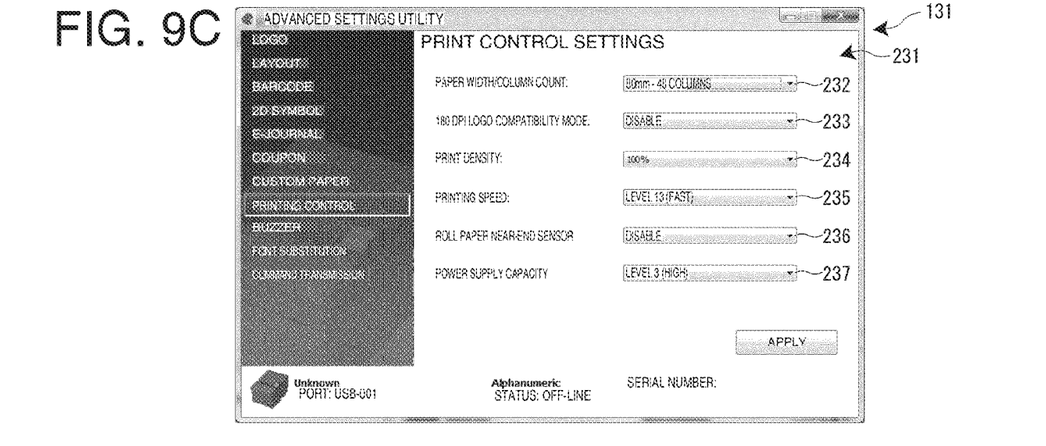
FIG. 9C describes a print control configuration screen.

The custom (user-defined) paper size configuration screen 221 is a screen for setting a user-defined customer paper size (FIG. 9B). In the size definition area 222 the user can set a paper name, unit of measurement (mm/inch), the paper size (paper width/height), and margins (top, bottom, left, right margins). The saved custom paper size is shown in the list box 223.

The printing control configuration screen 231 (FIG. 9C) is a screen for setting the paper width and column count of the receipt printer 2, the compatibility mode for 180 dpi logo registration, the print density, the printing speed, whether there is a roll paper near-end sensor, and the power supply capacity from pulldown menus 232 to 237.

Figure 10A:
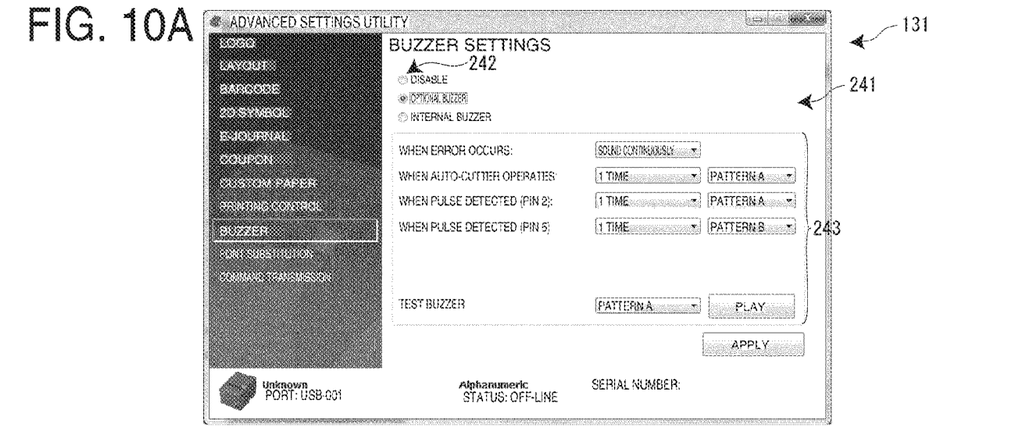
FIG. 10A describes a buzzer configuration screen.

The buzzer configuration screen 241 shown in FIG. 10A is a screen for configuring operation of the buzzer connected to the receipt printer 2 in detail. Radio buttons 242 are for selecting which buzzer to configure, and one button can be selected from options including disable (do not configure), optional buzzer (external buzzer), and internal buzzer. The pulldown menu group 243 can be used to set the timing and number of times the buzzer selected with the pulldown menu 242 sounds, the sound pattern, and to test the buzzer.

Figure 10B:
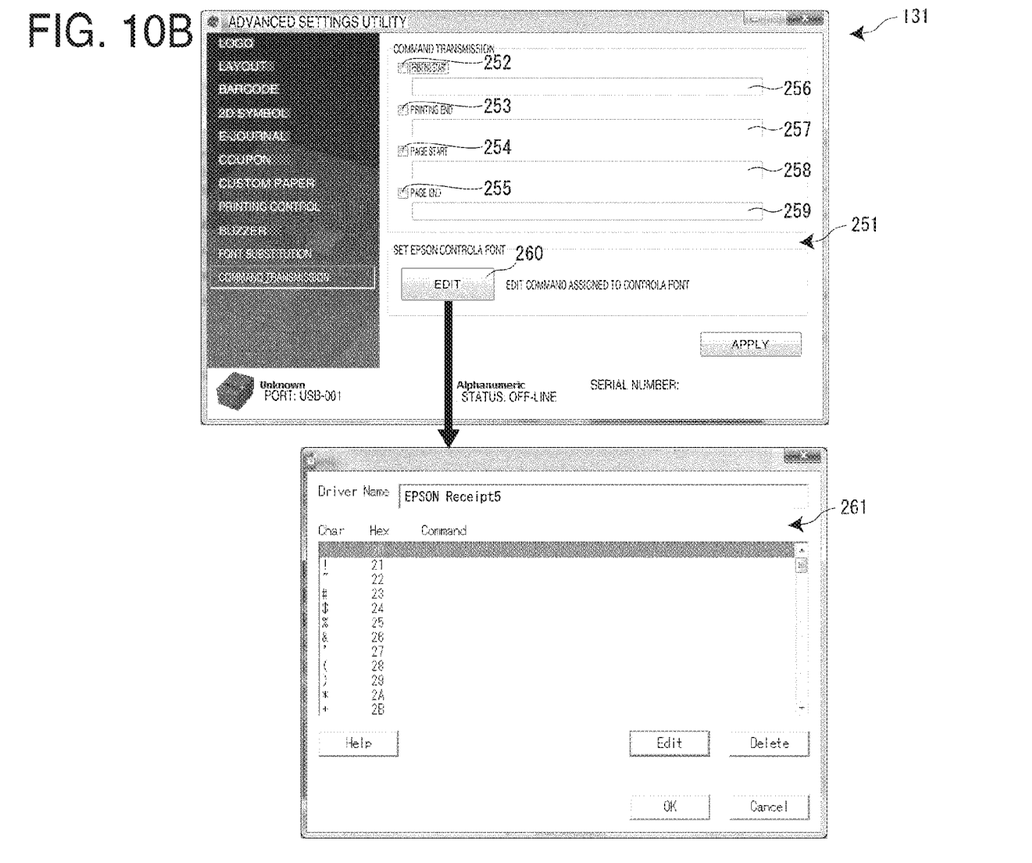
FIG. 10B describes a command transmission configuration screen.

The command transmission configuration screen 251 is a screen for configuring direction transmission of commands (ESC/POS commands) to the receipt printer 2 (see FIG. 10B). The commands that are sent at specific times can be set in the text boxes 256 to 259 by checking the check boxes 252 to 255 corresponding to the start of printing, end of printing, page start, and page end. Pressing the edit button 260 displays a command editor 261, and enables assigning an ESC/POS command to the ControlA font. Note that the ControlA font means a special font that executes an ESC/POS command linked to a specific character when that character is printed.

The font substitution screen 271 is described with reference to FIG. 11. The font substitution screen 271 is a screen for configuring substituting and printing a device font built in to the receipt printer 2 instead of a TrueType font (system font) used by the POS terminal 1.

The font names (TrueType font names) that can be selected as the source font, the font size (point size, described in detail below) specified when the TrueType font is used, and the device font substituted for the TrueType font, are displayed in list box 272. In this example, only monospaced TrueType fonts ("monospaced fonts" below) are displayed as the selectable source fonts in list box 272 (source font display unit).

When the user selects a TrueType font from the font substitution list in the list box 272 (source font selection unit), the selected font is displayed in text box 273. The user then selects the device font to use from the pulldown menu 274 (replacement font selection unit). In this example, the monospaced front BatangChe is selected as the source font, and the device font FontA11 is selected as the replacement font.

When the device font to use is selected from the pulldown menu 274, the advanced settings utility 24 displays a preview (screen display) of the print data created using the TrueType font selected as the source font by the POS application 22, and calculates the font size of the TrueType font (source font) in points that will result in the same printout using the device font selected as the replacement font (font size calculation unit). This point size is calculated based on the font width of the TrueType font selected as the source font, and the font width of the device font specified as the replacement font. The advanced settings utility 24 then displays the calculated point size in the text box 275. In this example, the point size (8.5 points) is calculated and displayed based on the font width of the TrueType font BatangChe and the font width of the device font FontA11.

When the apply button 276 is pressed, the calculated font size (points) and the specified replacement font information are reflected in the list box 272 (font size display unit) in a form reflecting the selected source font. More specifically, in the example shown in FIG. 11, by looking at the content of the list box 272, the user can know that the TrueType font BatangChe will be replaced by the device font FontA11, and when the POS application 22 uses the TrueType font BatangChe, the font size should be set to 8.5 points.

As described above, this embodiment of the invention improves user convenience by displaying a user interface (printer settings interface 51) for basic settings and a user interface (advanced settings interface screen 131) for detailed settings in separate screens (windows) as the user interface for configuring the receipt printer 2.

Figure 11:
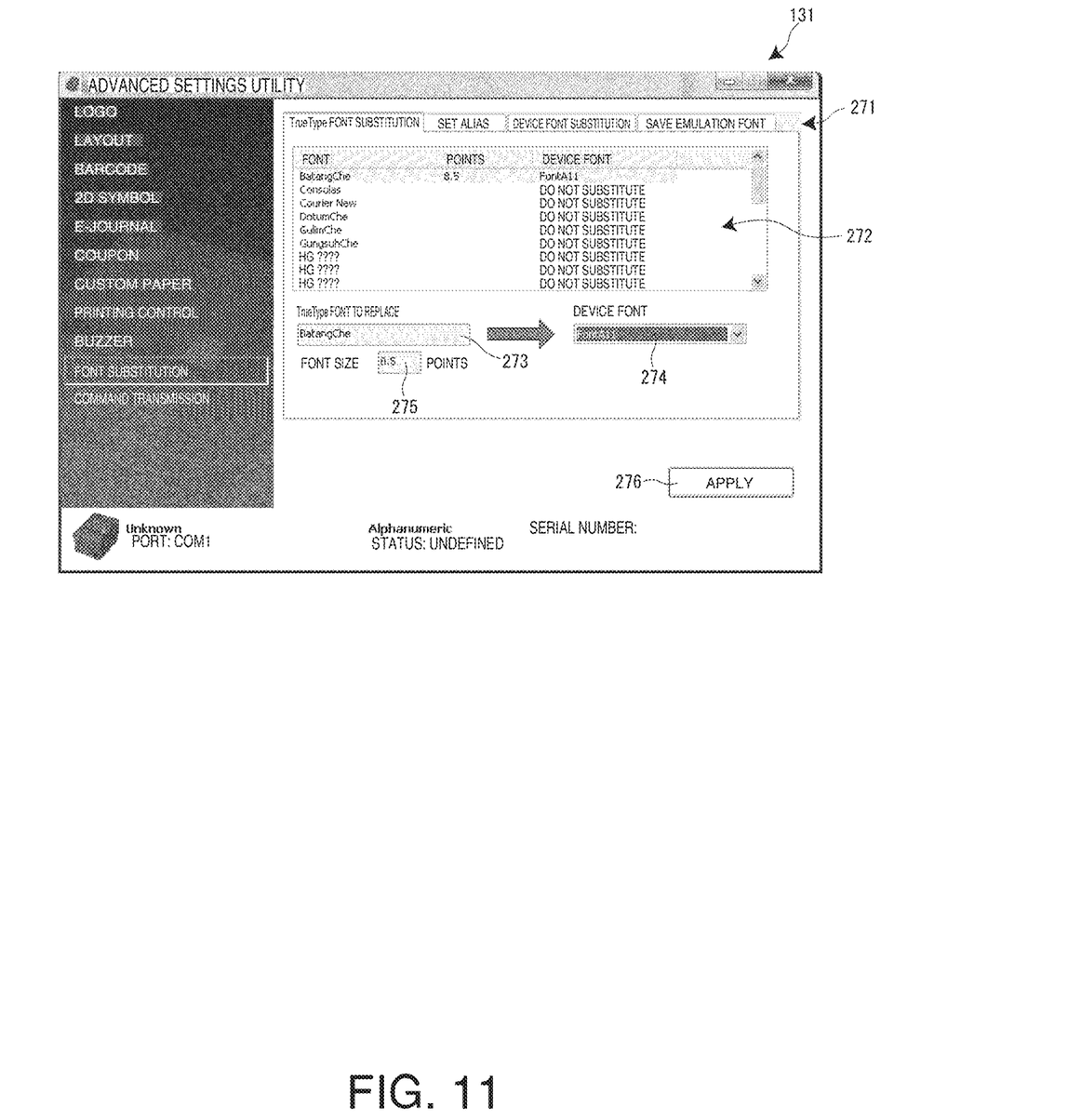
FIG. 11 describes a font substitution configuration screen.
Figure 12:
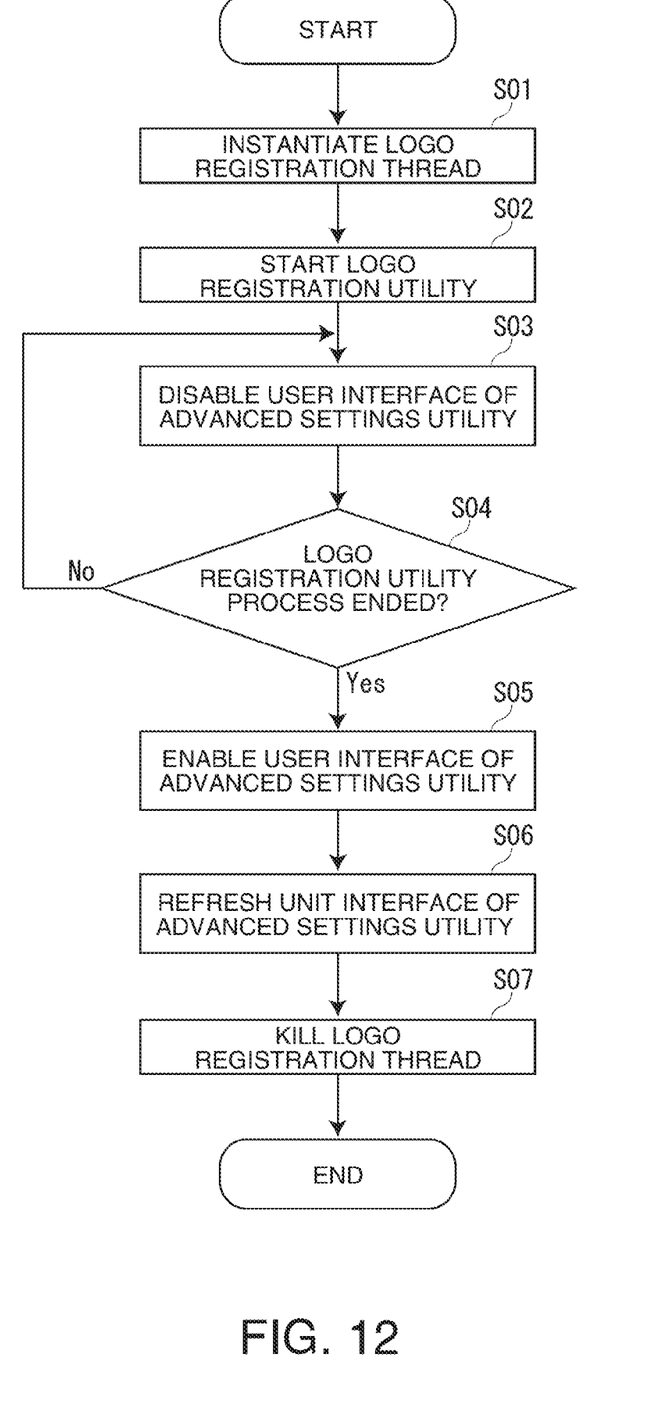
FIG. 12 is a flow chart describing the control process of the advanced settings utility when starting the logo registration utility.

In addition, only monospaced TrueType fonts (system fonts) are displayed as the source fonts, a display screen applying the selected source font (such as a print preview displayed on the POS terminal 1), and the font size (points) of the source font resulting in the same printout using the selected replacement font, are displayed in the font substitution screen (font substitution screen 271, shown in FIG. 11). As a result, regardless of which TrueType font is selected as the source font, the user can achieve the same printout printed with the device font as the printout shown on screen using the TrueType font by setting and printing with the point size displayed in the font substitution screen 271. More specifically, a convenient user interface that enables the user to easily achieve the desired printout without confusing operations can be provided.

When configuring a peripheral device 3 connected to the receipt printer 2 (configuration screen 91 of the peripheral device (FIG. 3 and FIG. 4)), setup screens based on the actual configuration of the peripheral device 3 connected to the receipt printer 2 can be displayed. As a result, because unnecessary setup screens (such as a setup screen for a peripheral device 3 that is not connected to the receipt printer 2) are not displayed when the appropriate device configuration is selected, the risk (such as confusion regarding the options for which peripheral device 3 to set) of user confusion when configuring the peripheral device 3 can be reduced, and the risk of the user making wrong settings can be reduced.

Note that selecting the device configuration of the peripheral device 3 in the configuration screen 91 of the peripheral device in this embodiment is done by the user selecting the item corresponding to the combination of the peripheral devices 3 actually connected from a pulldown menu 92, but this step could be automated. In this event, the printer driver 23 has a device configuration information acquisition unit that communicates with the receipt printer 2 at specific times and acquires from the receipt printer 2 information about the configuration of peripheral devices 3 connected to the receipt printer 2, and automatically sets the items that can be selected from the pulldown menu 92 based on the acquired device configuration information. As a result, when the user displays the configuration screen 91 of the peripheral device, menu selections matching the configuration of peripheral devices 3 actually connected can be reliably displayed.

This embodiment describes a cash drawer 41, external buzzer 42, and internal buzzer 43 as examples of peripheral devices 3 connected to the receipt printer 2, but some embodiments of the invention can obviously be used with configurations having other devices connected.

Furthermore, this embodiment describes a POS terminal 1 as an example of a print control device, and a receipt printer 2 as an example of a printing device, but the invention is not so limited. For example, some embodiments of the invention can also be applied to configurations in which the print control device is a common personal computer or server, or the printing device is a printer used in the home or office.

The processes of the POS terminal 1 described above can also be provided as a program executed by the control unit 11. The program can also be supplied stored on a storage medium (not shown in the figures). Examples of such storage media include CD-ROM, flash ROM, memory cards (CompactFlash (R), smart media, memory sticks), Compact Disc, magneto-optical discs, Digital Versatile Discs, and floppy disks.

The device configuration and steps in processes executed by the POS terminal 1 and receipt printer 2 are not limited to the foregoing, and can be varied in many ways. Such variations are not to be regarded as a departure from the spirit and scope of the invention, and all such modifications as would be obvious to one skilled in the art are intended to be included within the scope of the following claims.

What is claimed is:

1. A print control device that configures a peripheral device connected to a printing device, comprising:
    a device configuration selection unit that selects a peripheral device configuration; and
    a device configuration screen display unit that displays a configuration screen of the selected peripheral device based on the selected peripheral device configuration;
    wherein the printing device is a receipt printer;
    wherein the device configuration screen display unit displays configuration options for a cash drawer when a cash drawer is the selected peripheral device from the device configuration selection unit.

2. The print control device described in claim 1, further comprising:
    a device configuration information acquisition unit that acquires device configuration information from the printing device for peripheral devices connected to the printing device;
    the device configuration selection unit selecting the configuration of peripheral devices based on the device configuration information acquired by the device configuration information acquisition unit.

3. The print control device described in claim 1, wherein:
    the device configuration screen display unit displays a configuration screen of the peripheral device based on the selected peripheral device configuration as a single configuration screen.

4. The print control device described in claim 1, wherein:
    the device configuration screen display unit displays configuration screen for the selected peripheral device based on the device configuration selected in the device configuration selection unit so that configuration is possible timed to printing by the printing device.

5. The print control device described in claim 1, wherein:
    the device configuration screen display unit displays a configuration screen in which no setting can be made when no peripheral device being connected is selected by the device configuration selection unit.

6. The print control device described in claim 1, wherein:
    the device configuration screen display unit displays configuration options for an internal buzzer when an internal buzzer is the selected peripheral device from the device configuration selection unit.

7. The print control device described in claim 1, wherein:
    the device configuration screen display unit displays configuration options for a cash drawer and an internal buzzer when a cash drawer and an internal buzzer are the selected peripheral devices from the device configuration selection unit.

8. The print control device described in claim 1, wherein:
    the device configuration screen display unit displays configuration options for an external buzzer when an external buzzer is the selected peripheral device from the device configuration selection unit.

9. A control method of a print control device that configures a peripheral device connected to a printing device, comprising:
    a device configuration selection step that receives a selection of a peripheral device configuration; and
    a device configuration screen display step that displays a configuration screen of the selected peripheral device based on the selected device configuration;
    wherein the printing device is a receipt printer;
    wherein the device configuration screen display step displays configuration options for a cash drawer when a cash drawer is the selected peripheral device.

10. The control method of a print control device described in claim 9, further comprising:
a device configuration information acquisition step that acquires device configuration information from the printing device for peripheral devices connected to the printing device;
the device configuration selection step selecting the configuration of the peripheral devices based on the device configuration information acquired by the device configuration information acquisition step.

11. The control method of a print control device described in claim 9, wherein:
the device configuration screen display step displays a configuration screen of the selected peripheral device based on the selected device configuration as a single configuration screen.

12. The control method of a print control device described in claim 9, wherein:
the device configuration screen display step displays a configuration screen of the selected peripheral device based on the selected device configuration so that configuration is possible timed to printing by the printing device.

13. The control method of a print control device described in claim 9, wherein:
the device configuration screen display step displays a configuration screen in which no setting can be made when no peripheral device being connected is selected.

14. The control method of a print control device described in claim 9, wherein:
the device configuration screen display step displays configuration options for an internal buzzer when an internal buzzer is the selected peripheral device.

15. The control method of a print control device described in claim 9, wherein:
the device configuration screen display step displays configuration options for a cash drawer and an internal buzzer when a cash drawer and an internal buzzer are the selected peripheral devices.

16. The control method of a print control device described in claim 9, wherein:
the device configuration screen display step displays configuration options for an external buzzer when an external buzzer is the selected peripheral device.

17. A computer-readable recording medium storing a program executed by a control unit of a print control device that configures a peripheral device connected to a printing device, comprising as steps executed by the control unit:
a device configuration selection step that receives a selection of a peripheral device configuration; and
a device configuration screen display step that displays a configuration screen of the selected peripheral device based on the selected device configuration;
wherein the printing device is a receipt printer;
wherein the device configuration screen display step displays configuration options for a cash drawer when a cash drawer is the selected peripheral device.

\* \* \* \* \*